US006262780B1

United States Patent
Ho et al.

(10) Patent No.: US 6,262,780 B1
(45) Date of Patent: *Jul. 17, 2001

(54) CHANNEL SELECTION REMOTE CONTROL

(75) Inventors: Kesse Ho, Westminster; John P. Godwin, Los Angeles, both of CA (US)

(73) Assignee: Hughes Electronics Corporation, El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,782

(22) Filed: Nov. 17, 1998

(51) Int. Cl.[7] .............................. H04N 5/44; H04N 5/50; H04N 5/268
(52) U.S. Cl. .......................... 348/734; 348/734; 348/731; 348/705; 455/575
(58) Field of Search ................................. 348/734, 705, 348/731, 10; 455/6.2, 575

(56) References Cited

U.S. PATENT DOCUMENTS

| 4,392,022 | | 7/1983 | Carlson ..................................... 179/2 |
| 4,969,209 | * | 11/1990 | Schwob ................................. 455/158 |
| 5,210,611 | * | 5/1993 | Yee et al. ........................... 358/191.1 |
| 5,296,931 | * | 3/1994 | Na ......................................... 348/731 |
| 5,550,576 | | 8/1996 | Klosterman ............................... 348/6 |
| 5,673,089 | * | 9/1997 | Yuen et al. ............................ 348/734 |
| 5,886,746 | * | 3/1999 | Yuen et al. ............................. 348/564 |
| 5,900,867 | * | 5/1999 | Schindler et al. ..................... 345/327 |
| 5,901,366 | * | 5/1999 | Nakano et al. ........................ 455/575 |
| 5,909,183 | * | 6/1999 | Borgstahl et al. .............. 340/825.22 |
| 5,963,269 | * | 10/1999 | Beery ..................................... 348/570 |
| 5,963,624 | * | 10/1999 | Pope ................................. 379/110.01 |
| 5,978,050 | * | 11/1999 | Lee ....................................... 348/731 |
| 5,982,411 | * | 11/1999 | Eyer et al. ............................... 348/6 |
| 6,037,877 | * | 3/2000 | Matthews ........................ 340/825.03 |

* cited by examiner

Primary Examiner—Reinhard J. Eisenzopf
Assistant Examiner—Paulos Natnael
(74) Attorney, Agent, or Firm—John A. Crook; Michael W. Sales

(57) ABSTRACT

A remote control unit for efficiently selecting programming/channels is disclosed. The remote control unit is particularly applicable to receiver stations that receive transmitted signals from more than one source on more than one frequency. Movement back and forth between the different signal sources typically calls for the viewer to perform more than one selection operation. In the disclosed embodiment, a single selection operation (e.g., entry of a desired channel number or operation of one of the arrow keys or the up/down channel keys) initiates the several actions that are needed to move from one source to another and select a channel associated therewith. The different sources may be identified automatically based on channel assignments. In the disclosed embodiments, the channel number assignments for one signal source are in the range from "0" to "99," and the channel number assignments for another signal source are in the range from "100" to "999."

6 Claims, 4 Drawing Sheets

CHANNEL SELECTION REMOTE CONTROL

BACKGROUND OF THE INVENTION (a) Field of the Invention

The present invention relates in general to a channel selection apparatus that is used to select or tune a television or other receiver to a particular channel/frequency. More particularly, it relates to an improved remote control unit that can more efficiently navigate the available channel selections, particularly when the available channels originate from more than one source.

(b) Description of Related Art

Consumers in the U.S. and elsewhere expect television equipment that can conveniently integrate and display programming from a variety of sources, such as conventional off-the-air channels (a.k.a., "free TV"), or cable, and direct-to-home (DTH) satellite broadcasts. For example, since 1994, DIRECTV® consumers have had access to nearly 200 channels of DTH broadcast programming material and other services, as well as locally broadcast channels. In particular, the manufacturers of the integrated/receiver/decoder (IRD) units that receive and process these DTH broadcasts have also provided convenient access to other programming sources. For example, the typical IRD can receive programming from other sources, e.g., an off-the-air antenna or cable decoder, and selectively route either the DTH programming or the off-the-air/cable (terrestrial) programming to the associated display.

In a typical existing DTH system, the viewer is required to perform multiple operations on their remote control to switch from viewing programming from one source to viewing programming from another source. For example, in switching from DTH to terrestrial viewing, the user may be required to press one button to turn the IRD's "DTH" mode off, press another button to select the IRD's "TV" mode, then enter the number of the desired terrestrial channel. In order to return to DTH, the viewer would have to enter into the television the channel number (e.g., "03") or input selection (e.g., "line1") at which the television receives DTH programming from the IRD, press a button to select the IRD's DTH mode rather than TV mode, then enter the number of the desired DTH channel.

Accordingly, there is need for an apparatus and method that simplifies how viewers make programming selections using a simple and inexpensive remote control, particularly when such programming originates from a variety of sources.

SUMMARY OF THE INVENTION

The present invention addresses the shortcomings of known programming selection systems by providing an efficient and simple program/channel selection system including an improved remote control unit. According to the present invention, making a single viewer selection is enough to allow the system to identify the source of the selection and automatically switch the system to that source, without requiring the entry of additional information from the user. As an example, the channel assignments for the DIRECTV® and USSB® direct-to-home (DTH) broadcast system are typically distinct from off-the-air or cable sources. In particular, DTH channel assignments for DIRECTV and USSB DTH broadcasts have a number range from 100 to 999, while off-the-air or cable channels typically have a number range from 0 to 99. Accordingly, in the disclosed example, the channel number, the channel up/down buttons, the right/left arrow keys, or the up/down arrow keys may be used as the single viewer selection entry that uniquely identifies both the desired program/channel and its source. The viewer can simply enter the desired channel number or, according to other aspects of the present invention, activate the arrow keys and/or channel up/down keys, and the remote control automatically performs all of the operations necessary to switch to the appropriate source and select and display the desired programming/channel on a standard IRD.

Accordingly, the present invention may be embodied in a method of selecting transmitted programming from a plurality of sources that include at least a first signal source associated with a first range of channel numbers and a second signal source associated with a second range of channel numbers. The method includes the steps of inputting to a selection means information identifying a channel selection, determining whether said channel selection information falls within said first range of channel numbers or said second range of channel numbers; automatically, in response to said determination, generating by said remote control a sequence of standard control commands; and routing the signal source associated with said channel selection to a display and selecting said channel selection. Preferably, the first range of channel numbers does not overlap the second range of channel numbers. For example, the first range of channel numbers may be from 0 to 99, and the second range of channel numbers may be from 100 to 999. The selection means may be the plurality of keys or buttons found on a conventional remote control device.

Alternatively, the present invention may be embodied in a method of selecting transmitted programming including the steps of: assigning a first signal source to a predetermined selection entry; inputting to a selection means information identifying a desired selection entry; determining whether said selection information corresponds to said predetermined selection entry; automatically, in response to determining that said selection information corresponds to said predetermined selection entry, routing the first signal source to a display and selecting a channel associated with said desired selection entry. For example, the predetermined selection entry may be the user activating a selection means, wherein the selection means is the up/down arrow, left/right arrow or channel up/down keys on a remote control or a control panel of a decoder. One or more of these keys may be assigned to a particular source of programming, e.g., off-the-air broadcasts. Upon determining that the user has activated one of these keys, the method automatically places the system in the appropriate mode to receive off-the-air broadcasts then selects the appropriate channel.

The present invention may further be embodied in a remote control for selecting programming at a receiver station, which includes a plurality of receiver station subunits for receiving and processing transmitted programming signals, said subunits comprising at least a programming signal decoder and a display. The remote control including a plurality of selection means, a controller and a transmitter; said plurality of selection means of said remote control capable of being activated by a user to generate one or more selection communications; said controller receiving said selection communications and generating control communications in response thereto; said transmitter receiving said control communications and generating and transmitting to at least one of said receiver station subunits command communications in response to said control communications; and said controller programmed such that a single selection entry made at said plurality of selection means causes more than one of said command communications to be transmitted.

In another embodiment, the present invention is a remote control for selecting programming at a receiver station, which includes a plurality of receiver station subunits including at least a display, a first signal source, a second signal source, and a router for selectively placing said first signal source and said second signal source in communication with said display. The remote control includes a plurality of selection means, a controller and a transmitter; said plurality of selection means of said remote control capable of being activated by a user to generate one or more selection communications; said controller receiving said selection communications and generating control communications in response thereto; said transmitter receiving said control communications and generating and transmitting to at least one of said receiver station subunits command communications in response to said control communications; said command communications causing selected ones of said subunits to perform a plurality of distinct operations including routing said first signal source to said display, selecting a particular signal available from said first signal source, routing said second signal source to said display, and selecting a particular signal available from said second signal source; and said controller programmed such that a single selection entry made at said plurality of selection means causes one or more of said receiver station subunits to perform at least two of said distinct operations.

The invention itself, together with further objects and attendant advantages, will best be understood by reference to the following detailed description, taken in conjunction with the accompanying drawings.

DESCRIPTION OF THE PREFERRED EMBODIMENTS

Figure 3:
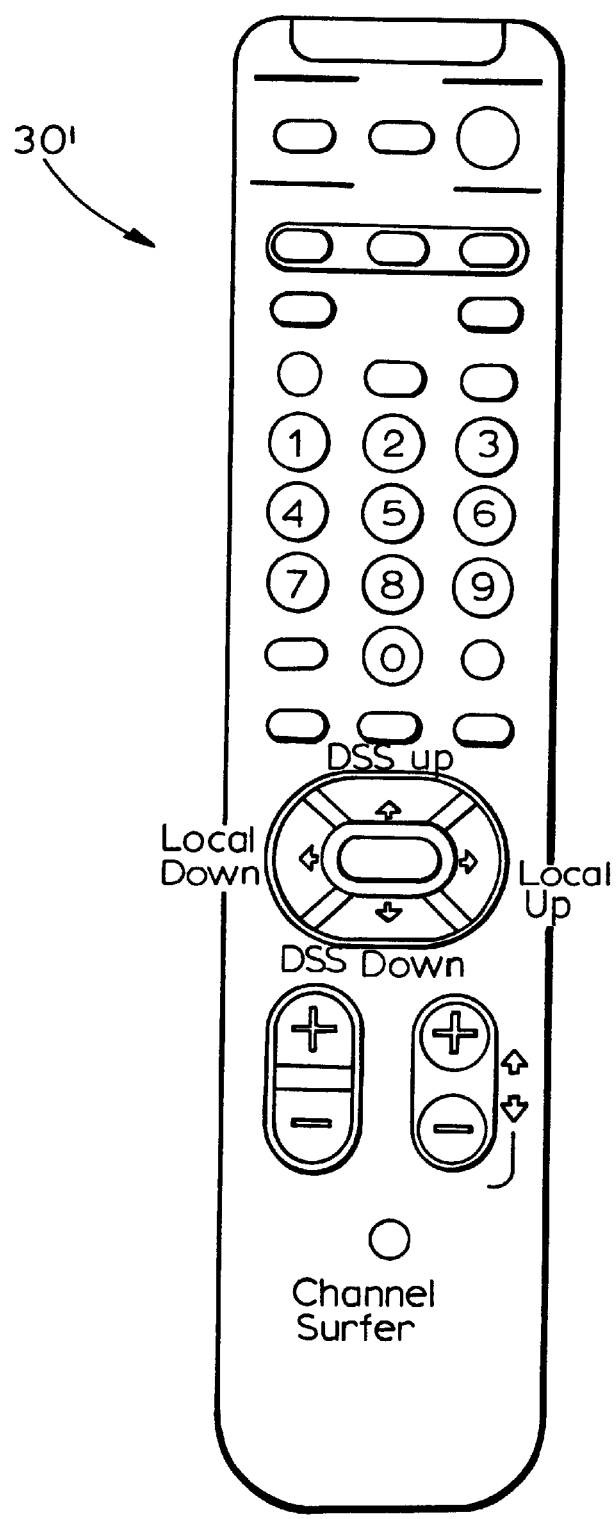
FIG. 3 illustrates an exemplary button assignment and layout for the remote control of FIG. 2.
Figure 4:
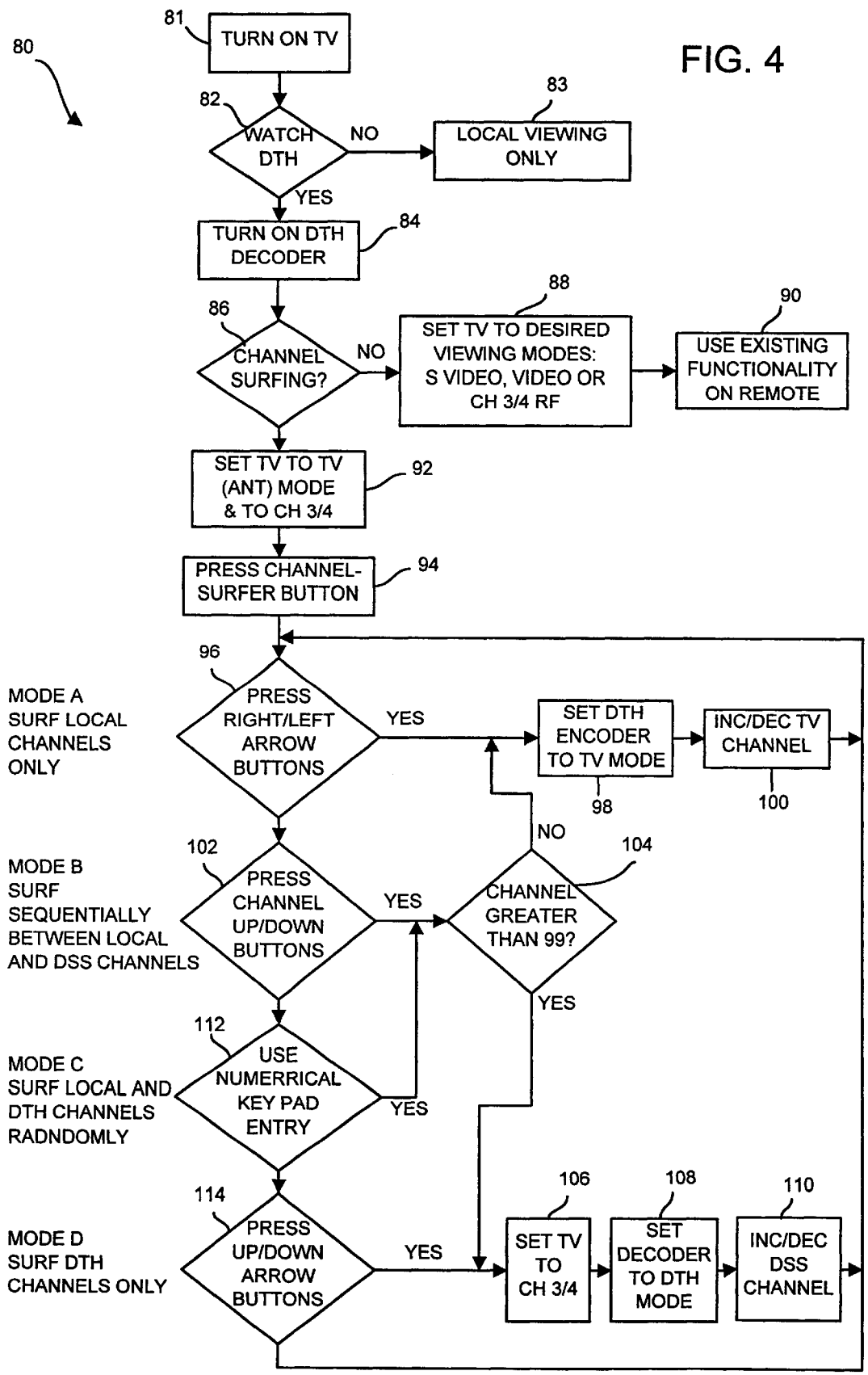
FIG. 4 is a flow chart illustrating methods embodying the present invention.

The present invention involves a method and apparatus for efficiently selecting programming that originates from different sources by means of an inexpensive remote control. Exemplary hardware/systems for implementing the present invention are shown in FIGS. 1–3, while an exemplary method of implementing the invention is shown in FIG. 4.

Figure 1:
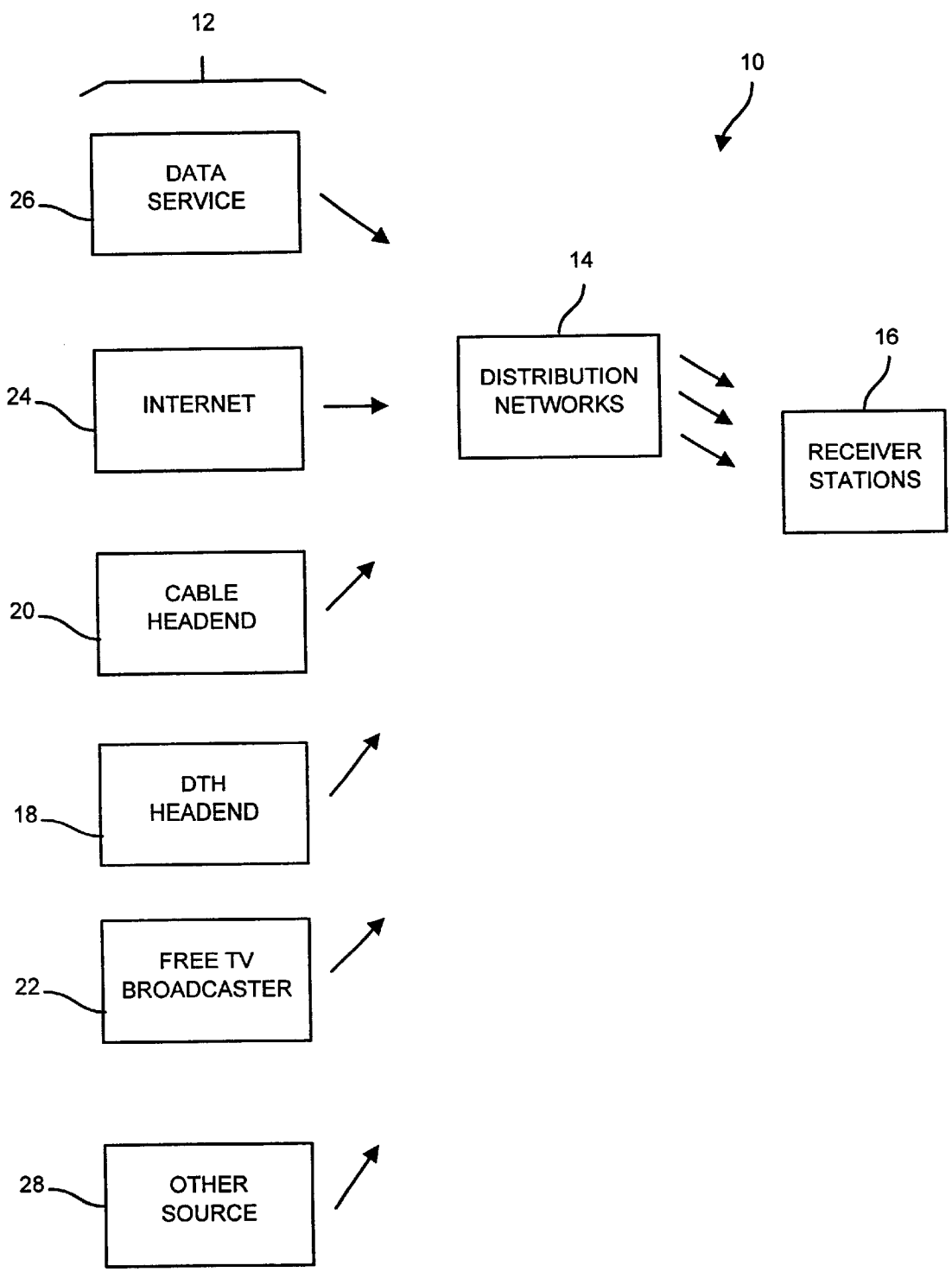
FIG. 1 is a diagram of a signal distribution and reception system capable of incorporating the present invention.

FIG. 1 illustrates a general signal distribution system 10 capable of utilizing the present invention. The signal distribution system 10 generally includes a plurality of broadcast/transmission centers 12, a signal distribution network 14 and a plurality of receiver stations 16. The broadcast/transmission centers 12 can include a direct-to-home (DTH) head end 18, a cable head end 20, an off-the-air broadcaster 22, the "Internet" 24, a commercially available data source 26 (e.g., a ticker service), or some other source 28. The distribution network 14 may be wireless, hardwired, or a combination of the two. The receiver stations 16 are of the type appropriate for receiving, processing and displaying the various transmissions, including off-the-air antenna, satellite antenna, DTH decoders, cable decoders, televisions, PC-type monitors, and other elements.

Figure 2:
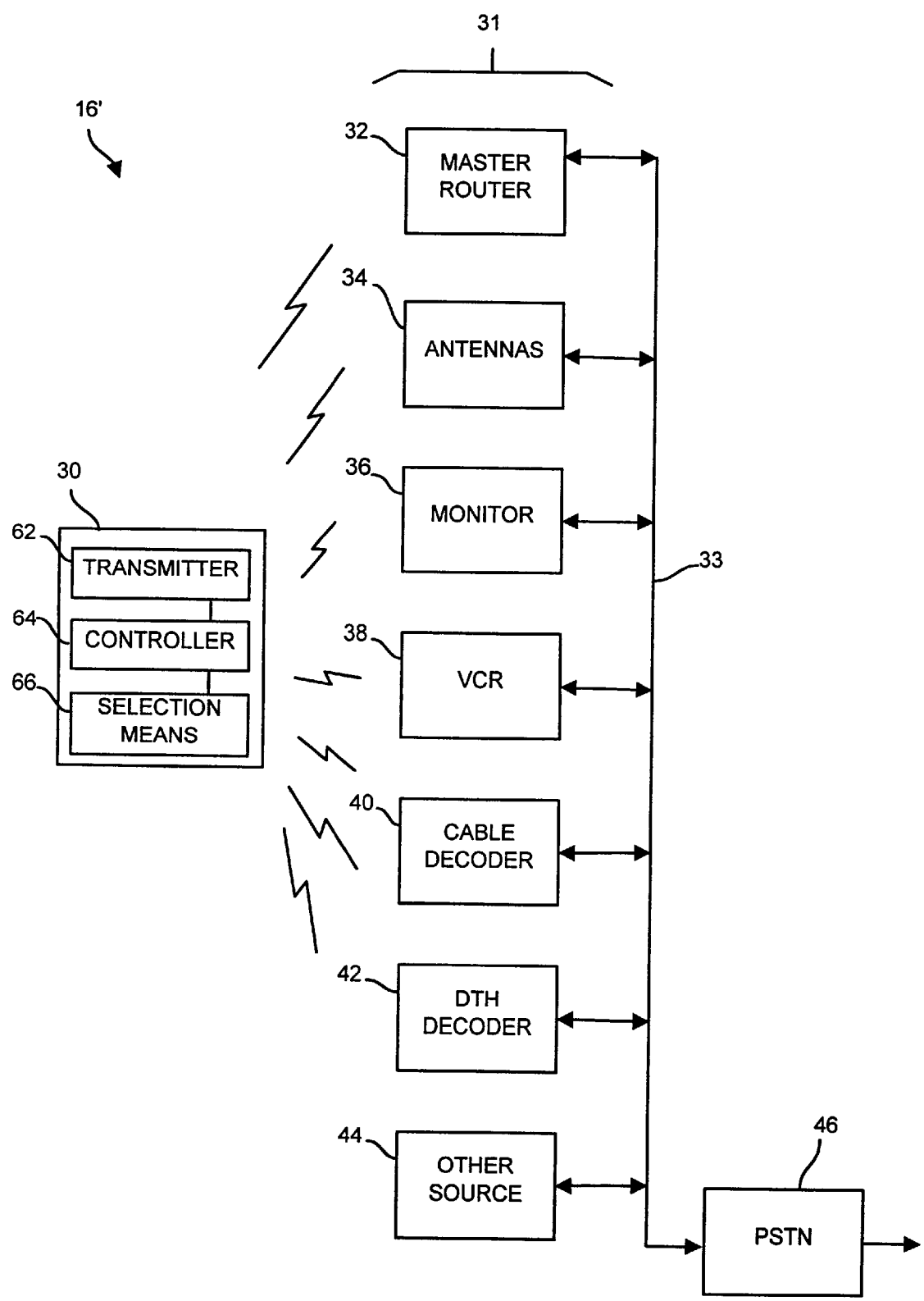
FIG. 2 is a more detailed illustration of the receiver station shown in FIG. 1.

FIG. 2 illustrates at 16' a more detailed representation of the receiver station 16 shown in FIG. 1. The receiver station 16' shown in FIG. 2 includes a remote control 30 and a plurality of receiver station subunits 31. The remote control 30 includes a selection means 66, a controller 64 and a transmitter 62. The selection means 66 may be the key/buttons or other information entry means found on conventional remote control devices. It is contemplated that the selection means 66 and/or remote control 30 may include virtually any other information entry medium, including a control panel on one of the sub-units 31, point-and-click, touch sensitive, or similar devices, speech recognition devices, and others. The subunits 31 include a master router 32, antennas 34, a monitor 36, a VCR 38, a cable decoder 40, a DTH decoder 42, and other sources 44. Although the router 32 is shown as a separate unit, it could be included in any of the other receiver station subunits 31 (e.g., the DTH decoder 42). The subunits 31 communicate with one another via a hardwired or wireless communications link 33. The communications link 33 may also provide the receiver station 16' with access to the public switched telephone network (PSTN) 46.

The remote control 30 and the subunits 31 are configured such that entering a single viewer selection at the remote control 30 is enough to prompt the remote control 30 to generate all of the command signals that are required to automatically switch the programming source of the receiver station 16' to the source 31 associated with the selection, if necessary, then select the desired programming, without requiring the entry of additional information from the user. As an example, the channel assignments for the DIRECTV and USSB direct-to-home (DTH) broadcast system are distinct from off-the-air or cable sources. In particular, DTH channel assignments for DIRECTV and USSB DTH broadcasts have a number range from 100 to 999, while off-the-air or cable channels have a number range from 0 to 99. Accordingly, in the disclosed example, the channel number, the channel up/down buttons, the right/left arrow keys, or the up/down arrow keys may be used as the single viewer selection entry that uniquely identifies both the desired program/channel and its source. The viewer can simply enter the desired channel number or activate the arrow keys and/or channel up/down keys, and the system automatically performs all of the operations necessary to switch to the appropriate source and select and display the desired programming/channel.

FIG. 3 illustrates a remote control 30' having an exemplary button/key configuration that may be used in connection with the present invention. The "selection means" shown in FIG. 3 includes a plurality of keys/buttons each having designated functions. The keys/buttons include numeric keys ranging from 0 to 9, left, right, up and down arrow keys, a "DTH" mode key, a "TV" mode key, and a so-called "channel surfer" mode key. In general, depressing the DTH mode key causes the remote control to generate and transmit to the DTH decoder 42 command signals that instruct the DTH decoder 42 to output the decoded DTH signals, while depressing the TV mode key causes the remote control to generate and transmit to the DTH decoder 42 command signals that instruct the DTH decoder 42 to output "other source" signals including the cable signals, the off-the-air or "TV" signals, the data signals or the "other" signals.

Depressing the "channel surfer" mode key places the DTH decoder in a mode that implements the method of the present invention. When in the channel surfer mode, the remote control 30 (via its selection means 66, controller 64 and transmitter 62) requires only a single selection input to automatically generate and transmit to the DTH decoder 42 and/or the monitor 36, all of the command signals that are required to place the DTH decoder 42 in the appropriate mode and select the desired programming/channel.

FIG. 4 is a flow diagram illustrating a method 80 embodying the present invention. The method 80 corresponds to the key/button layout shown in FIG. 3, and the hardware configuration (remote control 30, DTH decoder 42 and monitor 36) shown in FIG. 2. The method 80 begins at block 81 where the monitor 36 is activated. At decision block 82, the user determines whether he/she want to watch local programming or DTH programming. If the answer at decision block 82 is no, the viewer watches local/cable programming in a conventional manner at block 83. If the answer to decision block 82 is yes, the viewer activates the DTH decoder 42 at block 84. At decision block 86, the user determines whether he/she wants to use the "channel surfer" mode embodying the present invention. If the answer at decision block 86 is no, the user operates the monitor 36 and the DTH decoder 42 in a conventional manner at block 88, e.g., setting the monitor 36 to channel 3/4 rf, S-video, video or other. The viewer then uses the existing remote control functionality at block 90.

If the answer at decision block 86 is yes, the user sets the monitor 34 to antenna/TV mode and to channel 3/4 at block 92, then presses the "channel surfer" button on the remote control 30 at block 94. As illustrated, in FIG. 4, the channel surfer mode access four modes, A–D. In Mode A, the right/left arrows are used to automatically place the system in local TV mode and surf the local channels only. Mode A is illustrated by decision block 96 and blocks 98 and 100. In Mode B, the up/down channel buttons are used to surf sequentially between local and DTH channels. Mode B is illustrated by decision blocks 102 and 104, blocks 98 and 100, and blocks 106–110. In particular, in decision block 104 the method 80 determines whether the next channel will be greater than "99". In the present example, DTH channels are assigned to numbers "100" to "999", and all other sources, e.g., cable and off-the-air local television, are assigned channel numbers "0" to "99". Accordingly, the system can evaluate the actual channel entry to determine which source is required. If the answer to decision block 104 is no, the method 80 moves to block 98 where it sets the DTH decoder 42 to TV mode then increases/decreases the monitor 36 channel setting at block 100. From block 100, the method 80 returns to decision block 96. If the answer at decision block 104 is yes, the method 80 sets the monitor 36 to channel 3/4 at block 106, sets the DTH decoder 42 to DTH mode at block 108, and increase/decreases the DTH decoder channel setting at block 110. From block 110, the method 80 returns to decision block 96.

In Mode C, the numerical key pad is used to enter the desired channel, and the remote control 30 controls the decoder 42 and the monitor 36 to move the system randomly between local and DTH channels. Mode C starts at decision block 112, and proceeds through blocks 104, 98, 100, 106, 108 and 110 in the same manner as described above in connection with Mode B. In Mode D, the up/down arrow keys/buttons are used to automatically place the DTH decoder 42 in DTH mode and surf the DTH channels only. Mode D is illustrated by decision block 114 and blocks 106, 108, and 110.

Although the present invention has been described in connection with certain modes (A–D) wherein a single user selection entry (e.g., entering a channel number or operating the channel up/down or arrow keys) controls certain of the receiver station subunits 31 to move through certain predetermined sequences of operations, it should be noted that the single user selection entry could prompt any set or sequence of distinct operations at said subunits 31 that would be required to select and present the desired programming. Such distinct operations could include powering on/off any of the subunits 31, activating or de-activating a given operating mode of one of the subunits 31, switching connections between the subunits 31, tuning the subunits 31 to a particular channel, dialing a telephone number, or any other operation that the subunit 31 is ordinarily capable of.

Of course, it should be understood that a range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of selecting transmitted programming from a plurality of sources including a first source and a second source, wherein the first and second sources are controlled by a single remote control device and wherein both the first and second sources can be commanded to increment or decrement the selected channel being processed, the steps comprising:

assigning to a first selection means which is part of said remote control device the function of incrementing the channel selection of said first source;

assigning to a second selection means which is part of said remote control device the function of decrementing the channel selection of said first source;

assigning to a third selection means which is part of said remote control device the function of incrementing the channel selection of said second source;

assigning to a fourth selection means which is part of said remote control device the function of decrementing the channel selection of said second source;

in response to activation of said first, second, third or fourth selection means, generating a mode command sequence which comprises an appropriate sequence for selecting the output of said first source for display if said first or second selection means is activated, or for selecting the output of said second source for display if the third of fourth selection means is activated; and thereafter, generating a tuning command which comprises an appropriate command sequence to increment the tuner of said first source if the first selection means was activated, or an appropriate command sequence to decrement the tuner of said first source if the second selection means was activated, or an appropriate command sequence to increment the tuner of said second source if the third selection means was activated, or an appropriate command sequence to decrement the tuner of said second source if the fourth selection means was activated.

2. The method of claim 1 wherein said remote control device includes an "up" button, a "down" button, a "left" button, and a "right" button, and wherein said first selection means corresponds to said "up" button, said second selection means corresponds to said "down" button, and wherein said third selection means corresponds to one of said "left" or "right" buttons, and said fourth selection means corresponds to the other of said "left" or "right" buttons.

3. A method of selecting transmitted programming from a plurality of sources that include at least a first signal source associated with a first range of channel numbers and a second signal source associated with a second range of channel numbers wherein said first signal source comprises a terrestrial broadcast receiver and said second signal source comprises a satellite receiver, the steps comprising:

receiving by means of a selector which is part of a remote control device information identifying a desired channel selection;

determining by means of a controller which is part of said remote control device whether said channel selection information falls within said first range of channel numbers or said second range of channel numbers; and automatically, in response to said determination, generating by said remote control device an output sequence of control commands, said output sequence comprising one or more mode selection commands for selecting output signals from one of said first or second signal sources, and a channel selection command which is in a format compatible with the selected signal source to tune the selected signal source to the desired channel, wherein the step of automatically generating said output sequence of control commands further comprises the steps of:

generating a first mode selection command to cause the satellite receiver to select a terrestrial broadcast signal pass-through mode if said channel selection information falls within said first range of channel numbers, or generating a second mode selection command to cause the satellite receiver to select a satellite signal processing mode if said channel selection information falls within said second range of channel members, and generating a channel selection command sequence which is appropriate to cause the selected signal source to tune to the desired channel.

4. The method of claim 3 wherein the step of generating said channel selection command sequence comprises the step of generating a first channel selection command sequence in a first format compatible with said first signal source if said channel selection information falls within said first range of channel numbers, or generating a second channel selection command sequence in a second format compatible with said second signal source if said channel selection information falls within said second range of channel numbers.

5. A method of selecting transmitted programming from a plurality of sources that include at least a first signal source associated with a first range of channel numbers and a second signal source associated with a second range of channel numbers wherein said first signal source comprises a terrestrial broadcast receiver and said second signal source comprises a satellite receiver, the steps comprising:

receiving by means of a selector which is part of a remote control device information identifying a desired channel selection;

determining by means of a controller which is part of said remote control device whether said channel selection information falls within said first range of channel numbers or said second range of channel numbers; and automatically, in response to said determination, generating by said remote control device an output sequence of control commands, said output sequence comprising one or more mode selection commands for selecting output signals from one of said first or second signal sources, and a channel selection command which is in a format compatible with the selected signal source to tune the selected signal source to the desired channel, wherein the step of automatically generating said output sequence of control commands further comprises the steps of:

generating a first mode selection command to cause the terrestrial broadcast receiver to select a first signal input if said channel selection information falls within said first range of channel numbers, or generation a second mode selection command to cause the terrestrial broadcast receiver to select a second signal input if said channel selection information falls within said second range of channel numbers.

6. A method of selecting transmitted programming from a plurality of sources that include at least a first signal source associated with a first range of channel numbers and a second signal source associated with a second range of channel numbers wherein said first signal source comprises a terrestrial broadcast receiver and said second signal source comprises a satellite receiver, the steps comprising:

receiving by means of a selector which is part of a remote control device information identifying a desired channel selection;

determining by means of a controller which is part of said remote control device whether said channel selection information falls within said first range of channel numbers or said second range of channel numbers; and automatically, in response to said determination, generating by said remote control device an output sequence of control commands, said output sequence comprising one or more mode selection commands for selecting output signals from one of said first or second signal sources, and a channel selection command which is in a format compatible with the selected signal source to tune the selected signal source to the desired channel, wherein the step of automatically generating said output sequence of control commands further comprises the steps of:

generating a first mode selection command to configure said satellite receiver, and generating a second mode selection command to configure said terrestrial broadcast receiver.

* * * * *